M. G. MARTIN.
HIGH TEMPERATURE COOKING SYSTEM.
APPLICATION FILED NOV. 1, 1919.
1,377,088.
Patented May 3, 1921.
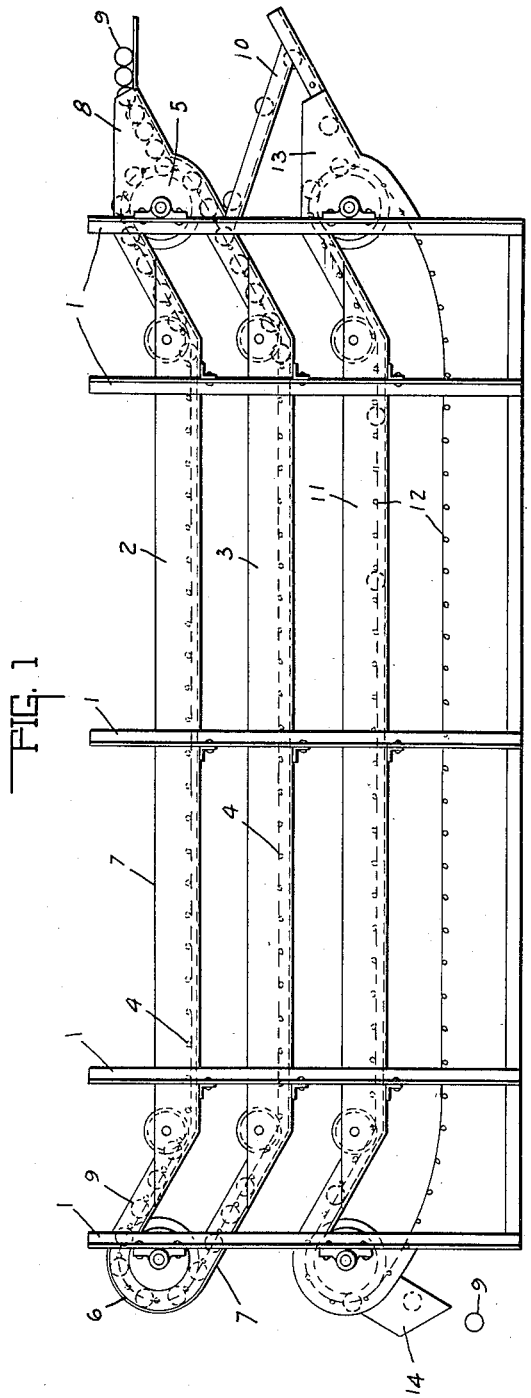
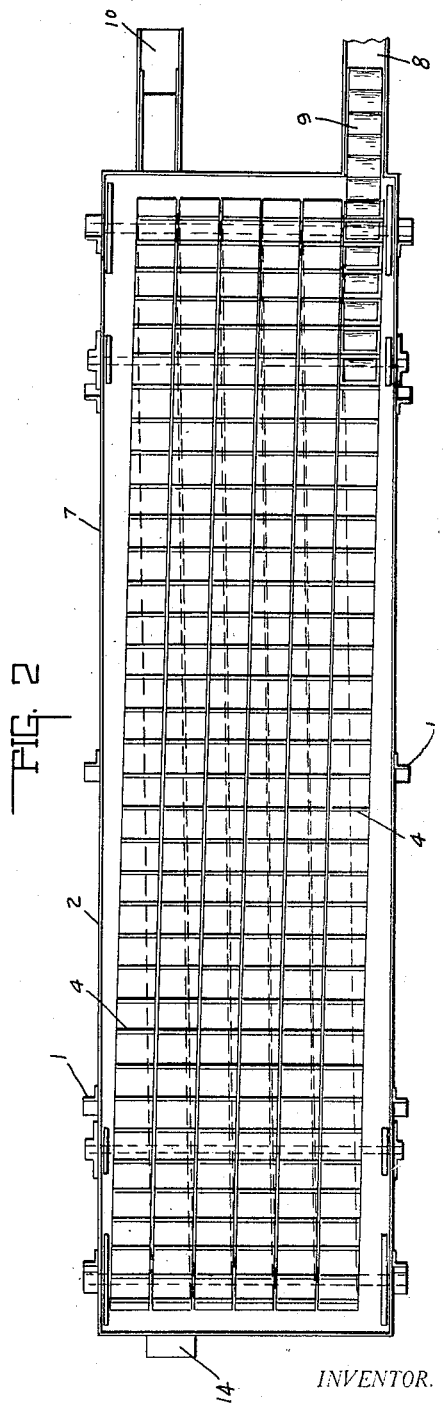
INVENTOR.
Monroe G. Martin
BY
ATTORNEYS.

UNITED STATES PATENT OFFICE.

MONROE G. MARTIN, OF EDINBURG, INDIANA.

HIGH-TEMPERATURE COOKING SYSTEM.

1,377,088. Specification of Letters Patent. Patented May 3, 1921.

Application filed November 1, 1919. Serial No. 335,207.

*To all whom it may concern:*

Be it known that I, MONROE G. MARTIN, a citizen of the United States, residing at Edinburg, in the county of Johnson and State of Indiana, have invented certain new and useful Improvements in High-Temperature Cooking Systems, of which the following is a specification.

This invention relates to a high temperature cooking system, more especially to an open bath, high temperature, continuous agitation system which is capable of processing all kinds of goods, both low and high temperature. Hitherto in cooking high temperature goods, such as corn, peas, beans, meats, etc., which require a temperature above 212° F. and up to 250° F., it was considered necessary to heat in the presence of steam under pressure in order to obtain the requisite conditions to thoroughly cook the goods.

Many difficulties and disadvantages were encountered in such a system, such as the escape of steam into the room upon the discharge of a can from the cooking machine, rusting of cans, high cost of fuel, inefficient heating, and the long time necessary for complete cooking. I obviate all these advantages by my invention, it being among the objects thereof to devise a system of cooking which utilizes the heating medium at atmospheric pressure, prevents rusting or corrosion of cans, is economical of fuel, and is capable of cooking goods quickly and thoroughly.

In carrying the objects of my invention into effect, I provide a heating bath comprising an oily or like substance capable of being heated to a comparatively high temperature (namely: above 212° F.) without substantial volatilization or decomposition, and having no deleterious action on the canned material. Preferably, I cause the sealed cans to pass continuously through the oil heated to the proper temperature, the cans being rolled along in the oil which practically entirely covers the cans while in motion.

The oil, being lighter than water and the cans, causes them to sink to the bottom of the heating vessel where they are rolled along by an endless carrier. The oil retains the heat imparted to it by the heating coils without giving off any substantial amounts of vapor, thus conserving the fuel. On account of its relatively good heat conductivity and the fact that the oil forms a film on the can surface, heat is quickly and efficiently transmitted through the can. This film remains on the can after cooling in water and constitutes a protection against rusting even in a room which is very damp.

By reason of the high degree of penetration of the heat into the can I have been enabled to greatly reduce the length of time necessary for the cooking operation. Where ordinarily by the old process the time consumed in cooking high temperature goods ranged from thirty-five minutes to two hours under pressure. I have accomplished the same results in from two to twenty minutes. On the average, I have been enabled to cut down the time to about one-fifth that of the old process.

The oil which I prefer to use for the purpose of this invention is a light lubricating fraction of petroleum such as is designated in the trade as "straw" oil and which is liquid at comparatively low temperatures and the flashing point of which is in the neighborhood of 300 F. and above. While there are several different names in the trade for this class of oil, the name herein employed is commonly used and, as used herein, is intended to mean any light fraction of petroleum which will remain normally liquid at comparatively low temperatures, and having a flashing point at approximately 300 F. or above.

Referring to the accompanying drawings forming a part hereof, and in which similar reference characters denote similar parts:

Figure 1, represents a side sectional view of a machine adapted to carry out my new process, and Fig. 2, a plan view of the same.

The frame 1 of the machine has attached to it, superposed heated pans 2 and 3 through which an endless carrier 4 passes successively. The carrier is driven by pulley 5 and runs over guide pulleys 6. Both the endless carrier and the pans are covered by a casing 7. On one end of the machine is an intake 8 through which cans 9 are fed to the endless carrier 4, and are carried through pans 2 and 3 successively a number of times in a spiral path. A discharge opening 10 allows the withdrawal of the cans from the opposite end of the endless carrier.

Directly beneath the pans 2 and 3, which are adapted to contain oil, and are heated by steam coils (not shown) is a pan 11 filled with cold water. An endless carrier 12 runs through pan 11 and an intake 13 is provided to receive cans discharged at point 10 from carrier 4, whereby the endless carrier 12 carries such cans through the cold water to cool the same and discharges them through opening 14.

It will be seen that by this arrangement the process of cooking and cooling is continuous, and the apparatus comparatively simple. The cans are rolled along in the pans 2 and 3 and agitated so that the contents of the cans are always in motion, thus very efficiently conducting the heat from the oil bath into the interior of the cans. My machine provides an automatic discharge of the cans from the cooking baths into the cooling bath and from the cooling bath into the store room.

I am aware that many attempts have been made to produce such an arrangement which will allow high temperature goods to be quickly and economically cooked, but such processes have not been successful for various reasons. One process utilizes salt solutions, such as calcium chlorid, as baths for the cans, but such solutions corrode the cans, suffer changes in boiling points, give off vapors and are difficult to handle. A pressure steam process has been proposed, but this is very wasteful of fuel, and with the discharge of each can a puff of steam is released into the room.

Having thus fully described my said invention, what I claim as new and desire to secure by Letters Patent, is:

1. In canning, the process which consists in canning the goods and then cooking them in a bath of oil comprising a light lubricating fraction of petroleum oil of a character that will remain liquid at approximately freezing temperature, and having a flashing point above cooking temperature, substantially as set forth.

2. In canning, the process which consists of canning the goods and then cooking the same in a bath of oil of a comparatively light character adapted to remain normally liquid at ordinary and comparatively low temperatures and of the character commonly known as "straw" oil, substantially as set forth.

It witness whereof I have hereunto set my hand and seal at Indianapolis, Indiana, this 23rd day of October, A. D. nineteen hundred and nineteen.

MONROE G. MARTIN. [L. S.]

Witnesses:
H. C. BIERMAN,
M. L. SHULER.